L. W. THOMPSON.
SPEED REGULATION OF ALTERNATING CURRENT MOTORS.
APPLICATION FILED JULY 10, 1918.
1,408,844.   Patented Mar. 7, 1922.
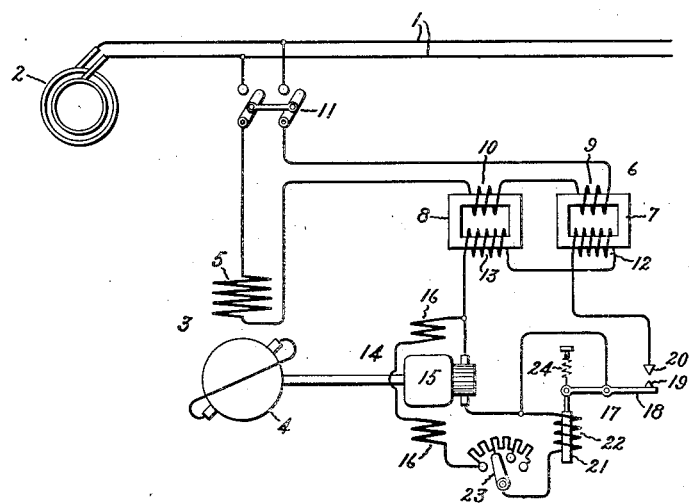
Inventor:
Louis W. Thompson,
by ⟨signature⟩
His Attorney.

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

SPEED REGULATION OF ALTERNATING-CURRENT MOTORS.

1,408,844.  Specification of Letters Patent.  Patented Mar. 7, 1922.

Application filed July 10, 1918. Serial No. 244,168.

*To all whom it may concern:*

Be it known that I, LOUIS W. THOMPSON, a citizen of the United States, residing at Schenectady, in the county of Schenectady, State of New York, have invented certain new and useful Improvements in Speed Regulations of Alternating-Current Motors, of which the following is a specification.

My invention relates to speed regulation of alternating current motors and has for its object to provide a new and improved system of automatic speed regulation for such motors.

The voltage and current in an alternating current circuit may be controlled by connecting thereto induction means, such as a reactor or transformer, and developing in the magnetic circuits of the induction means a regulatable unidirectional flux so as to change the permeability of the magnetic core of the induction means. While it is preferable when controlling a circuit in this manner to develop in the magnetic circuits of the induction means a unidirectional flux, nevertheless the desired control may in a measure be accomplished by developing in the magnetic circuits of the induction means a regulatable alternating flux having a lower frequency than the frequency of the circuit. Since unidirectional flux and unidirectional current may be properly considered as flux and current of zero frequency, the expression "flux having a lower frequency than the frequency of said circuit" as used herein is intended to include a unidirectional flux as well as an alternating flux, while the expression "current having a lower frequency than the frequency of said circuit" is intended to include a unidirectional current as well as an alternating current. In accordance with my invention, therefore, I propose to regulate the speed of an alternating current motor by connecting to a winding thereof induction means of the kind referred to and varying the electromotive forces impressed upon said winding and the current therein by varying the permeability of the core of the induction means by developing therein magnetic flux having a lower frequency than the frequency of the alternating current source, from which the motor is driven, and having values dependent upon the speed of the motor.

My invention may best be understood by reference to the following description taken in connection with the accompanying drawing, while the scope of my invention is defined in the appended claims.

Referring to the accompanying drawing consisting of a single figure, in which is shown diagrammatically one modification of my invention applied to the control of an alternating current repulsion motor, 1 denotes alternating current supply mains connected to a single phase alternating current generator, 2, 3 denote a repulse motor having an armature 4 and a winding 5, and 6 denotes induction means comprising cores 7 and 8, consisting of suitable magnetic material, upon which are located windings 9 and 10. The winding 5 of the motor 3 may be connected, in series with the windings 9 and 10, across the supply mains 1 by means of the switch 11. The cores 7 and 8 are also provided with magnetizing windings 12 and 13 which are adapted to be energized by direct current supplied from the generator 14. The generator 14 comprises an armature 15, connected to be rotated by the armature 4 of the motor 3, and shunt field windings 16. 17 denotes a vibratory device for controlling the energization of the windings 12 and 13 which comprises a movable contact carrying arm 18, a contact 19 carried thereby, a contact 20 cooperating with contact 19, a core 21 pivotally connected to the contact carrying arm 18, and an operating winding 22 for actuating the core 21. The operating winding 22 is connected in series with an adjustable resistance 23 and with the shunt field windings 16 across the aramture 15. An adjustable spring 24 is associated with the arm 18 to permit of adjustment of the action of the vibratory device 17. The contact 19 of the vibratory device 17 is electrically connected, through the contact carrying arm 18, to one side of the armature 15 and the contact 20 is connected, through the magnetizing windings 12 and 13, to the other side of the armature 15. The magnetizing windings 12 and 13 are so arranged with respect to the windings 9 and 10 that substantially no induced currents are caused to flow therein by reason of the alternating current in windings 9 and 10. The induction means for controlling the voltages supplied to the motor 3 may take other forms than that illustrated and the induction of currents in the magnetizing windings thereof may be prevented in other ways than that shown as will be evident to those skilled in the art.

The operation of my invention, as at present understood, is as follows:

Assume the alternator 2 to be operating and maintaining a voltage across the supply mains 1, the switch 11 to be closed, and the motor 3 to be in operation. Assume also that the adjustable spring 24 is adjusted so that when the speed of the generator 14, and hence the speed of the motor 3, is below the desired predetermined value the core 21 will be in its lower position and the contacts 19 and 20 engaged, whereas when the speed of the motor 3 is above the desired predetermined value the core 2 will be in its upper position and the contacts 19 and 20 disengaged.

First suppose that the speed of the motor 3 is below the desired predetermined value. The voltage generated in the armature 15 will then be low and hence the core 21 will be in its lower position and the contacts 19 and 20 will be engaged. Direct current will then be supplied to the windings 12 and 13 by the generator 14. The cores 7 and 8 will be magnetized thereby reducing the permeability of the magnetic cores 7 and 8 and the inductance of the windings 9 and 10 whereupon the voltage supplied to the motor 3, and hence the motor speed, will be increased. Now suppose that the speed of the motor 3 is above the desired predetermined value, the voltage generated in the armature 15 will then be high and hence the core 12 will be in its upper position, and the contacts 19 and 20 will be disengaged. The supply of direct current to the windings 12 and 13 will then be discontinued, thereby increasing the permeability of the magnetic cores 7 and 8 and the inductance of the windings 9 and 10 whereupon the voltage supplied to the motor 3, and hence the motor speed, will be decreased. This cycle will be rapidly repeated, since slight variations in the speed of the motor 3, and hence of the generator 14, will cause the contact 19 to vibrate into and out of engagement with the stationary contact 20 thereby regulating the inductances of windings 9 and 10 so that the speed of the motor 3 will be maintained substantially constant at the desired speed.

Although my invention is illustrated as applied to a single phase repulsion motor, nevertheless it may be applied to the control of polyphase motors of various types.

While I have herein shown and described one modification of my invention, I do not desire to be limited to the exact arrangement shown and described but seek to cover in the appended claims all those modifications which come within the true spirit and scope of my invention.

What I claim as new and desire to secure by Letters Patent of the United States, is:—

1. In combination, an alternating current motor, a source of alternating current adapted to be connected to a winding of said motor to drive said motor, and means for regulating the electromotive forces impressed upon said winding by said source to maintain the speed of said motor constant comprising a magnetic core, a winding thereon connected in the circuit of said source and said motor winding, and means controlled by the speed of said motor for varying the permeability of said magnetic core.

2. In combination, an alternating current motor, a source of alternating current adapted to be connected to a winding of said motor to drive said motor, and means for regulating the electromotive forces impressed upon said winding by said source to maintain the speed of said motor constant comprising a magnetic core, a winding thereon connected in the circuit of said source and said motor winding, and means controlled by the speed of said motor for varying the self induction of the winding on said magnetic core.

3. In combination, an alternating current motor, a source of alternating current adapted to be connected to a winding of said motor to drive said motor, and means for regulating the electromotive forces impressed upon said winding by said source to maintain the speed of said motor constant comprising a magnetic core, a winding thereon connected in the circuit of said source and said motor winding, means for developing in said core flux of lower frequency than the frequency of said source, and means responsive to the speed of said motor for varying the amount of said flux developed in said core.

4. In combination, an alternating current motor, a source of alternating current adapted to be connected to a winding of said motor to drive said motor, and means for maintaining the speed of said motor constant comprising a magnetic core, a winding thereon connected in the circuit of said source and said motor winding for varying the electromotive forces impressed upon said motor winding by said source, a magnetizing winding on said core, means for supplying current of lower frequency than the frequency of said source to said magnetizing winding, and means responsive to the speed of said motor for varying the current in said magnetizing winding.

5. In combination, an alternating current motor, a source of alternating current adapted to be connected to a winding of said motor to drive said motor, and means for maintaining the speed of said motor constant comprising a magnetic core, a winding thereon connected in the circuit of said source and said motor winding for varying the electromotive forces impressed upon said motor winding, by said source a magnetizing winding on said core, a source of current for said magnetizing winding comprising a generator driven by said motor, and means responsive to the voltage of said generator for varying the current in said magnetizing winding.

6. In combination, an alternating current motor, a source of alternating current therefor, means for regulating the speed of said motor comprising self induction means having a magnetic core, a winding interposed between said motor and said source, and a magnetizing winding, said windings being so arranged as substantially to prevent the induction of currents in the latter winding by the alternating currents in the former winding, a source of direct current for said magnetizing winding comprising a generator driven by said motor, and a vibratory device responsive to the voltage of said generator for varying the current in said magnetizing winding.

In witness whereof, I have hereunto set my hand this 8th day of July, 1918.

LOUIS W. THOMPSON.